(No Model.) 2 Sheets—Sheet 2.
J. I. WOODRUFF & W. H. WAGNER.
CULTIVATOR.
No. 354,003. Patented Dec. 7, 1886.
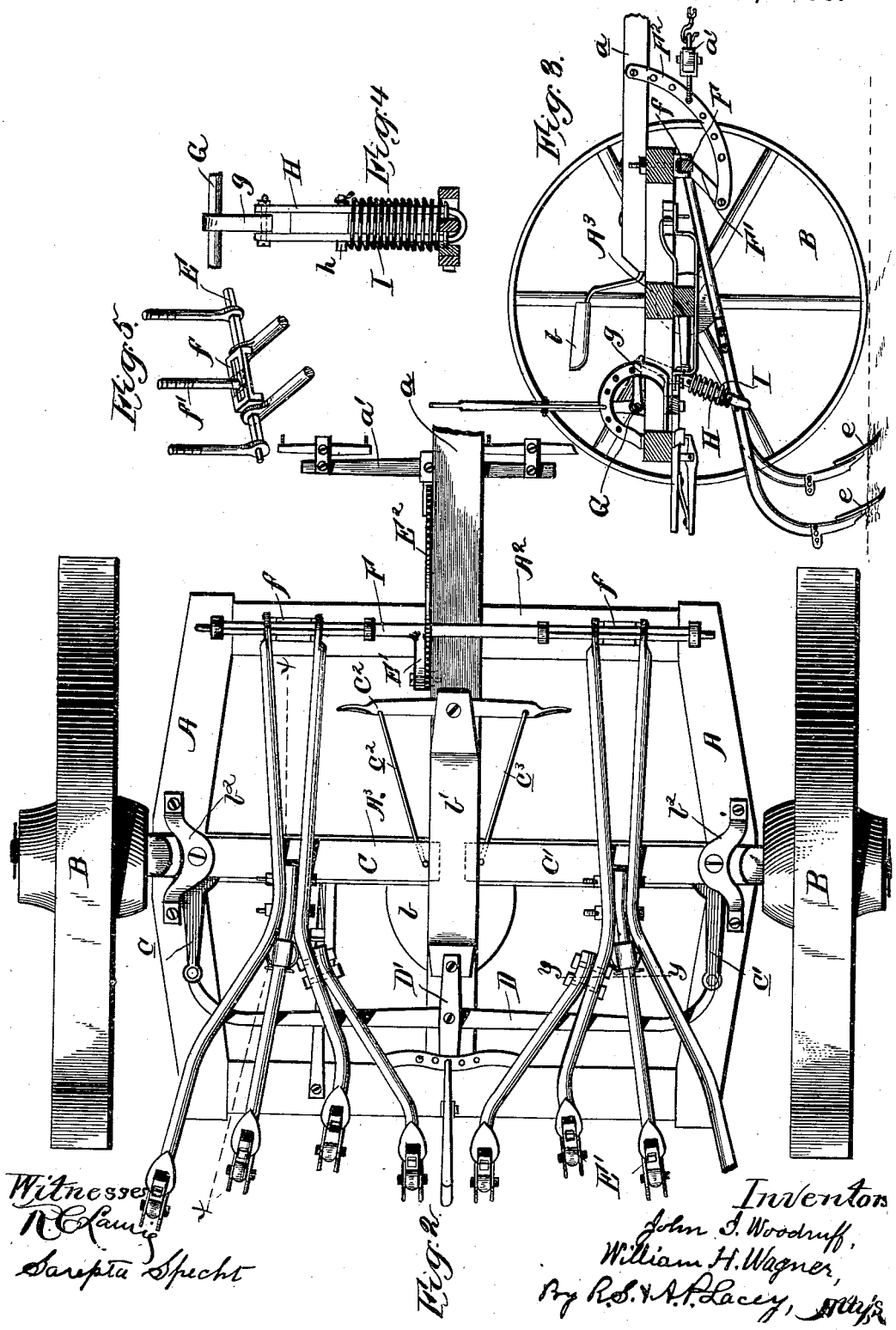

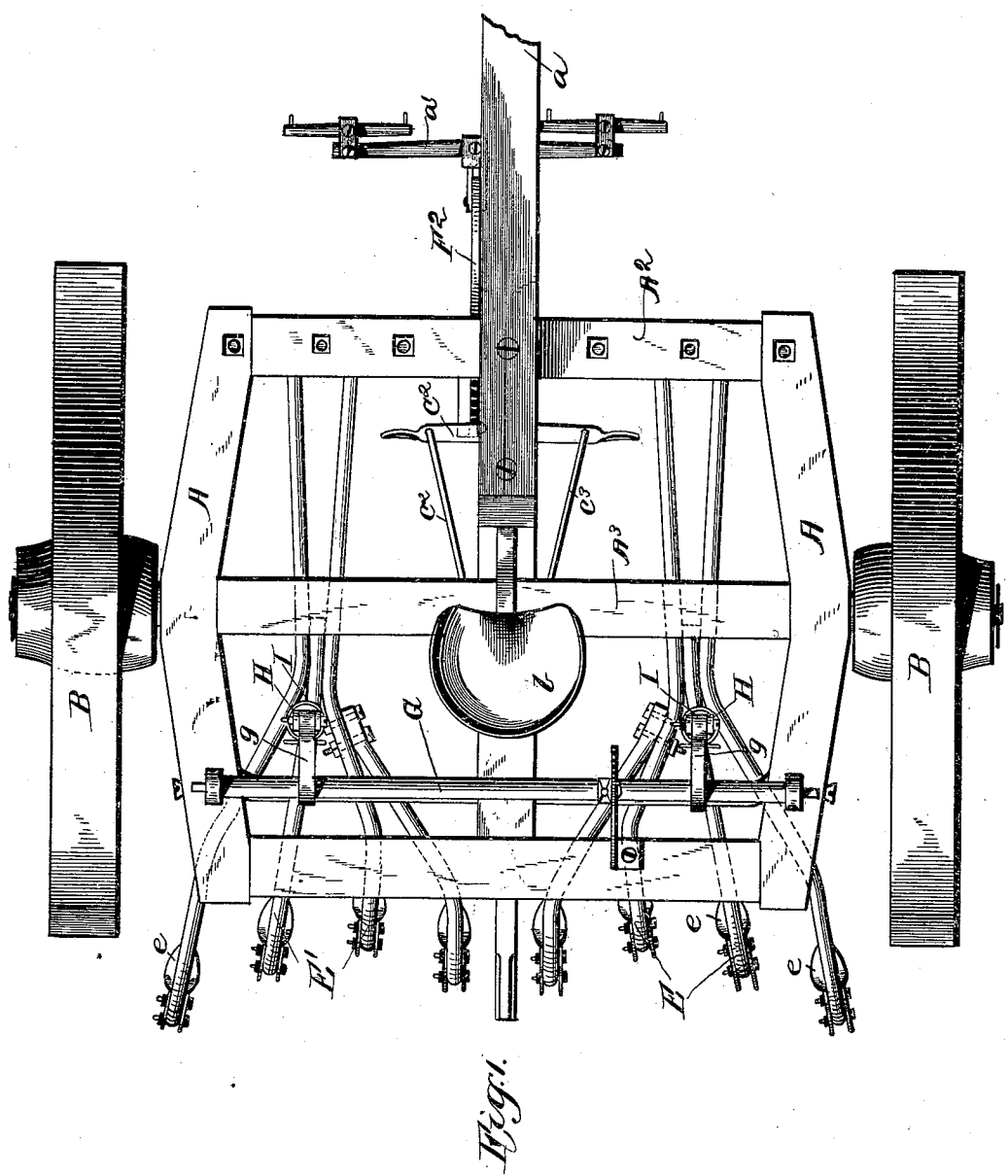

United States Patent Office.

JOHN I. WOODRUFF AND WILLIAM H. WAGNER, OF SELIN'S GROVE, PA.

CULTIVATOR.

SPECIFICATION forming part of Letters Patent No. 354,003, dated December 7, 1886.

Application filed August 16, 1886. Serial No. 211,049. (No model.)

*To all whom it may concern:*

Be it known that we, JOHN I. WOODRUFF and WILLIAM H. WAGNER, citizens of the United States, residing at Selin's Grove, in the county of Snyder and State of Pennsylvania, have invented certain new and useful Improvements in Cultivators; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to wheel-cultivators; and it consists in the novel features more fully hereinafter set forth and claimed, and shown in the annexed drawings, in which—

Figure 1 is a plan view. Fig. 2 is an inverted plan. Fig. 3 is a section on the line $x\ x$ of Fig. 1. Fig. 4 is a section on the line $y\ y$ of Fig. 2, and Fig. 5 is a perspective detail of the means for adjusting the cultivators.

The frame of the machine comprises side bars, A, front and middle, center and middle cross-bars, $A^2$, $A^3$, and $A^4$, respectively. It is mounted upon wheels B, journaled upon the outer ends of the levers C C', which constitute and form a divided axle. The levers are pivoted near their outer ends to the side bars and have arms $c\ c'$, which are connected to opposite ends of a bar, D, which in turn is connected with a lever, D', for adjusting it from side to side for guiding the machine in and out of the rows. This lever is used when walking, and when riding the machine is guided by the pivoted bar $C^2$, connected at its ends by links $c^2\ c^3$ with the ends of the levers C C', respectively, which is within convenient reach of the feet of the driver perched upon the seat $b$. When the wheels are to be held in a straight position, a movable clip from front cross-piece is placed over pivoted bar $C^2$. The inner ends of the levers are supported by a keeper, $b'$, and their outer ends by keepers $b^2$, which form braces for their pivots.

E E' are two gangs of cultivators composed of a number of drag-bars provided with cultivator-shovels $e$ on their lower ends. They are located upon opposite sides of the longitudinal center of the machine, and their forward ends are connected with a bar or rock-shaft, F, journaled in bearings secured to the under side of the front sill in such manner that they turn with said bar, but have a longitudinal adjustment thereon to bring them nearer to or farther from each other. They are held in an adjusted position by slides $f$, mounted upon the bar and engaging the ends of the gang, which are slotted and are held to the front sill of the frame by bolts $f'$. By loosening these bolts the slides can be moved, and with them the gangs, till the desired adjustment is made, when by tightening the bolts they will be held in such position.

An arm, F', extending from the rock-shaft, is connected with a curved bar, $F^2$, pivoted to the tongue $a$, to which the double-tree $a'$ is adjustably secured. By this construction the draft is utilized to hold the gangs down to their work independent of their weight and the weight of the frame, thereby lessening the load upon the animal's neck. The force with which the gangs are held down can be regulated by adjusting the double-tree nearer to or farther from the tongue.

A rock-shaft, G, journaled in bearings upon the side bars of the frame, has hangers H, depending from arms $g$ near each end, which are connected with the gangs at their lower ends in such manner that the latter may have an independent vertical movement. For this purpose the lower ends of the hangers are provided with slots through which one of the cultivator-beams of each gang passes. Coil-springs I, surrounding the slotted ends and confined between the cultivator-beams, and pins or stops $h$, yieldingly hold the gangs down to their work in addition to the application of the draft, as previously intimated.

The operation of the device can be readily understood from the foregoing description, reference being had to the drawings.

It is light, easily drawn forward, readily guided, and the force for holding the gangs down to their work can be quickly adjusted, and their depth governed at will. The parts can be replaced at a small cost and are readily accessible.

Having thus described our invention, what we claim as new, and desire to secure by Letters Patent, is—

1. In a wheel-cultivator, the combination of the divided axle having each part pivoted near the outer ends, the pivoted foot-bar having its opposite ends connected with the inner ends of the separated parts, arms extending rearwardly from said parts, a cross-bar uniting the arms, the lever pivotally connected with said cross-bar and pivotally supported at its inner end, and the segment and latch carried by said lever and adapted to engage with the segment, substantially as set forth.

2. The combination of the frame, the cross-bar F, journaled in bearings, the arm projecting from said bar and adapted to have the draft applied thereto, and the beams connected with the cross-bar to turn therewith, substantially as and for the purpose described.

3. The combination of the frame, the cross-bar E, journaled thereto, the gangs attached to the bar and adjustable lengthwise thereon, slotted guides mounted upon the bar, and bolts passed through the frame and adjustably securing the guides in place, as and for the purposes described.

4. The combination of the frame, the gangs connected therewith at their forward ends, the rock-shaft having arms, slotted hangers depending from the ends of the arms for the passage of a beam of the gangs, and coil-springs mounted on the hangers and held between said beams, and stops on the hangers, substantially as and for the purpose set forth.

In testimony whereof we affix our signatures in presence of two witnesses.

JOHN I. WOODRUFF.
WILLIAM H. WAGNER.

Witnesses:
J. M. STEESE,
GEO. H. STEINNIGER.